United States Patent Office.

ROGER W. WALLACE AND CARL F. CLAUS, OF LONDON, ENGLAND, ASSIGNORS OF TWO-TENTHS TO WILLIAM FREEMAN JACK AND EBENEZER STEWART, OF SAME PLACE; SAID WALLACE ASSIGNOR OF HIS REMAINING EIGHT TO SAID CLAUS.

UTILIZATION OF BY-PRODUCTS IN THE MANUFACTURE OF COAL-GAS.

SPECIFICATION forming part of Letters Patent No. 264,801, dated September 19, 1882.

Application filed July 25, 1882. (No specimens.) Patented in England January 20, 1877, No. 273.

*To all whom it may concern:*

Be it known that we, ROGER WILLIAM WALLACE and CARL FRIEDRICH CLAUS, both citizens of Great Britain, residing in London, England, have invented certain new and useful Improvements in the Purification of Gas and Utilization of By-Products, &c., (for which we have obtained a patent in Great Britain, No. 273, dated January 20, 1877,) of which the following is a specification.

Our invention relates to an improved process of producing ammoniacal gas to be employed as a purifying agent for illuminating-gas, and we will here premise that in the purification of such illuminating-gas we prefer to employ, instead of the scrubbers and purifiers now used, square towers filled with angle-irons or triangular bars of stone, stoneware or earthenware. The gas to be purified is admitted to the bottom, and is conducted away from the top of the said tower. As the purifying agent to absorb the carbonic acid contained in the gas we use ammoniacal gas, which we obtain by decomposing chloride of ammonium by means of burned or slaked lime, this chloride of ammonium being obtained in a subsequent process hereinafter described. The ammoniacal gas is passed along with the illuminating-gas through a number or series of the towers above described, and whatever quantity of ammonia remains unabsorbed is finally condensed in one, two, or more of the last towers of the series by a shower of water descending in the towers. This liquid is pumped from tower to tower in the opposite direction to that in which the gas travels, and the liquor resulting ultimately from this procedure, and which contains principally carbonate of ammonia, is drawn for further use from the tower, which, by reason of its favorable temperature and other conditions, will yield the liquid in the most concentrated form—that is to say, containing the greatest quantity of carbonate of ammonia. In other words, we allow a kind of "fractionation" to take place in the towers or scrubbers.

In carrying out our invention we dissolve in the concentrated carbonate-of-ammonia liquor, in separate apparatus, an equivalent quantity of chloride of sodium. Then we pass a current of carbonic acid through the mixture, whereby, as is well known, a bicarbonate of soda salt is deposited in the liquor. Chloride of sodium, as well as carbonate or bicarbonate of ammonia, remains in solution, either as bicarbonate of soda, or, if heat be applied to the mixture, as chloride of sodium, as will be understood by subsequent explanations. Other compounds of ammonium that may have been present in the original carbonate-of-ammonia solution employed—such as sulphide of ammonium or sulpho-cyanide of ammonium—do not enter into this decomposition, and remain in the mother-liquors hereinafter specified. Simultaneously with the bicarbonate of soda an equivalent quantity of chloride of ammonium is formed as mother-liquor, from which the bicarbonate of soda is separated by filtration. By applying heat to this mother-liquor we distill off the carbonate of ammonia contained in the same, and also the volatile sulphide of ammonium, which may also exist in the mother-liquors, and we collect these same products to be used again. After the volatile compounds have been driven off we put burned or slaked lime into the still, thereby producing ammoniacal gas, which we employ in the purification of the illuminating-gas—that is to say, we admit the same into the coal-gas in the manner described.

Instead of dissolving the chloride of sodium in solutions of carbonate of ammonia, as above described, concentrated or strong solutions of these salts may be made separately, then mixed together and carbonic acid injected into the mixture.

The ammonia derived from the coal-gas itself is constantly added to that which is introduced into the circulation by our process, and the quantity accumulated in excess of the quantity required for the purpose of purification we may conduct into sulphuric or hydrochloric acid for the manufacture of commercial salts of ammonium.

The chloride of calcium formed by the action of the lime on the chloride of ammonium may be either utilized in any convenient manner or discharged as refuse matter.

The bicarbonate of soda obtained in our process we heat in closed vessels to deprive it of one equivalent of carbonic acid, which, being unmixed with other gases, we collect in a gas-holder and force it therefrom, by means of suitable pumps, into the mixture of carbonate of ammonia and chloride of sodium, as above described.

As an auxiliary source of carbonic acid we use that obtained by heating bicarbonate of potash or soda after these bicarbonates have been produced from the carbonates by means of impure carbonic acid obtained from known sources.

The use of ammoniacal gas or liquid ammonia has been already proposed for the purification of illuminating-gas from carbonic acid; but in every instance the proposed method of its application has involved the use of slaked lime in connection with ordinary gas-liquor, and therefore insoluble carbonate of lime has been produced. This product has proved a more formidable nuisance and a more disagreeable residue to dispose of than that obtained from the dry-lime purifiers now used—a fact which has hitherto prevented the application of this otherwise effective process of purification. In all these processes, moreover, the carbonic acid in the ammoniacal liquor (which in its soluble form represents a certain value) has been not only lost, but actually converted into a source of annoyance.

One object of our invention is to obviate these difficulties by utilizing the carbonic acid without producing any solid refuse, as the chloride of calcium may be run into sewers or rivers, in which it will act as a disinfectant.

Having thus fully described our invention and the manner of performing the same, we wish it understood that we are aware of British Patent No. 1,904 of 1876, granted to E Solvay, and claim nothing claimed therein; and, also, we make no claim to the purification of gas by gaseous ammonia, or to the production of gaseous ammonia by the decomposition of chloride of ammonia by lime; but

What we claim is—

The process of purifying gas by separating ammonia from the ammoniacal liquor, consisting in treating the said liquor with chloride of sodium and carbonic acid, as specified, and then separating the chloride of ammonium from the solution, and finally decomposing the chloride of ammonium by lime, thereby reproducing pure ammoniacal gas.

In witness whereof we have hereunto set our hands before two subscribing witnesses.

ROGER WILLIAM WALLACE.
C. F. CLAUS.

Witnesses to signature of R. W. Wallace:
  M. JAMES BURN,
    *Solicitor, 11 and 12 Clements Lane, London, E. C.*
  R. A. WALLACE,
    *60 Mark Lane, E. C., Chemical Merchant's Clerk.*
Witnesses to signature of C. F. Claus:
  FRANCIS ARDING,
    *5 Jeffrey's Square, London, Merchant.*
  W. R. CALDWELL MOORE,
    *16 Mark Lane, Accountant.*